United States Patent
Trevino et al.

(10) Patent No.: US 8,409,822 B2
(45) Date of Patent: *Apr. 2, 2013

(54) COMPOSITION OF POROUS SILICA GRANULES FOR DELIVERING MICROORGANISMS

(75) Inventors: Ramiro Trevino, McKinney, TX (US); Steven R. Ellis, McKinney, TX (US)

(73) Assignee: Dairy Manufactuerers, Inc., Prosper, TX (US)

(*) Notice: Subject to any disclaimer, the term of this patent is extended or adjusted under 35 U.S.C. 154(b) by 75 days.

This patent is subject to a terminal disclaimer.

(21) Appl. No.: 12/898,435

(22) Filed: Oct. 5, 2010

(65) Prior Publication Data

US 2011/0082040 A1    Apr. 7, 2011

Related U.S. Application Data

(60) Provisional application No. 61/248,724, filed on Oct. 5, 2009, provisional application No. 61/248,776, filed on Oct. 5, 2009, provisional application No. 61/267,520, filed on Dec. 8, 2009.

(51) Int. Cl.
*C12Q 1/24* (2006.01)

(52) U.S. Cl. ......................................................... 435/30

(58) Field of Classification Search .................. 435/30
See application file for complete search history.

(56) References Cited

U.S. PATENT DOCUMENTS

| | | | |
|---|---|---|---|
| 3,644,215 A | 2/1972 | Muller | |
| 3,719,496 A | 3/1973 | Chen et al. | |
| 3,726,693 A | 4/1973 | Harris et al. | |
| 3,871,957 A | 3/1975 | Mohan et al. | |
| 3,882,253 A | 5/1975 | Schafer et al. | |
| 4,304,857 A | 12/1981 | Brouillard et al. | |
| 4,591,455 A | 5/1986 | Macedo et al. | |
| 4,647,464 A | 3/1987 | Todd, Jr. et al. | |
| 4,717,561 A | 1/1988 | Krivak et al. | |
| 4,971,820 A | 11/1990 | Likuski et al. | |
| 5,035,804 A | 7/1991 | Stowe | |
| 5,194,279 A | 3/1993 | Okel | |
| 5,395,808 A | 3/1995 | Miller et al. | |
| 5,403,799 A | 4/1995 | Miller et al. | |
| 5,443,845 A | 8/1995 | Felix | |
| 5,552,176 A | 9/1996 | Marino | |
| 5,569,634 A | 10/1996 | Miller et al. | |
| 5,635,214 A | 6/1997 | Ponchon et al. | |
| 5,678,238 A | 10/1997 | Billings et al. | |
| 5,906,843 A | 5/1999 | Dew et al. | |
| 6,001,322 A | 12/1999 | Chevallier et al. | |
| 6,184,408 B1 | 2/2001 | Burns et al. | |
| 6,991,802 B1 | 1/2006 | Ahola et al. | |
| 7,067,062 B2 | 6/2006 | Yang et al. | |
| 7,153,521 B2 | 12/2006 | Viot | |
| 7,538,067 B2 | 5/2009 | Hu et al. | |
| 2003/0026845 A1 | 2/2003 | Etzel et al. | |
| 2003/0091641 A1 | 5/2003 | Tiller et al. | |
| 2006/0019016 A1 | 1/2006 | Torcatis | |
| 2006/0147546 A1 | 7/2006 | Ferlin et al. | |
| 2007/0017195 A1 | 1/2007 | Witham et al. | |
| 2007/0281063 A1 | 12/2007 | Carapelli | |
| 2008/0071129 A1 | 3/2008 | Yang et al. | |
| 2009/0114569 A1 | 5/2009 | Osaheni et al. | |
| 2009/0120872 A1 | 5/2009 | Kroh | |
| 2009/0211453 A1 | 8/2009 | Nassivera et al. | |
| 2009/0214701 A1 | 8/2009 | Forchhammer et al. | |
| 2009/0232950 A1 | 9/2009 | Brothers, Jr. et al. | |

FOREIGN PATENT DOCUMENTS

| | | |
|---|---|---|
| EP | 0 067 459 A1 | 12/1982 |
| EP | 1 048 697 A2 | 11/2000 |
| FR | 2 573 772 A1 | 5/1986 |
| GB | 886533 | 1/1962 |
| GB | 938381 | 10/1963 |
| GB | 1253271 | 11/1971 |
| GB | 1262838 | 2/1972 |
| WO | 9812491 A1 | 3/1998 |
| WO | 2007139264 A1 | 6/2007 |
| WO | 2008061363 A1 | 5/2008 |
| WO | 2008121078 A1 | 10/2008 |
| WO | 2010/108211 A1 | 9/2010 |

OTHER PUBLICATIONS

Torkzaban S. et al. Transport and Fate of Bacteria in Porous Media. Water Resources Research 44:1-12, Apr. 5, 2008.*
Kameda A. et al. To See a Rock in a Grain of Sand. The Leading Edge 790-792, Aug. 2004.*
Drake L. et al. Macropore Size Distribution in Some Typical Porous Substances. Industrial and Engineering Chemistry 17(12)787-791, Dec. 1945.*
Curry C. et al. Comparative Study of Sand Porosity and a Technique for Determining Porosity of Undisturbed Marine Sediment. Marine Georesources & Geotechnology 22(4)231-252, 2004.*
PCT International Search Report, Dated Jan. 28, 2011, International Application No. PCT/US2010/051499.

* cited by examiner

*Primary Examiner* — Ralph Gitomer
(74) *Attorney, Agent, or Firm* — Bracewell & Giuliani LLP

(57) ABSTRACT

The present invention generally relates to compositions and methods of delivering substances in a dry mode. In one embodiment, the substance can be bacteria, enzymes, other microorganisms, or combinations thereof. The compositions that are in accordance with various embodiments of the present invention have varied uses, which can include delivering microorganisms to remove contaminates, such as oil, chemical, waste, or sewage, from soil, water, or air. In other embodiments, the substances can include liquid food, liquid food additives, liquid biotech agricultural ingredients, conventional liquid agricultural ingredients, liquid human wellness and dietary supplements, and liquid fragrances and beauty products.

17 Claims, No Drawings

COMPOSITION OF POROUS SILICA GRANULES FOR DELIVERING MICROORGANISMS

RELATED APPLICATIONS

This patent application claims priority to U.S. Provisional Patent Application Ser. Nos. 61/248,724 filed on Oct. 5, 2009, 61/248,776 filed on Oct. 5, 2009, and 61/267,520 filed on Dec. 8, 2009, all of which are incorporated by reference in their entireties.

BACKGROUND OF THE INVENTION

1. Field of the Invention

The present invention generally relates to compositions and methods of delivering substances in a dry mode.

2. Description of the Related Art

It is very difficult to deliver various substances in a dry form. For example, many essential minerals used to grow food crops exhibit hygroscopic properties when in their dry form. This makes it difficult to handle and store these dry forms as they tend to absorb water moisture from the atmosphere, resulting in a wet, sticky mess that does not flow easily. Hygroscopic minerals are usually prilled and coated or are crystallized to limit their natural hygroscopic properties. While this keeps the solids in a usable and flowable form, it limits their ability to dissolve in other liquids for final application. If these same minerals are dissolved in water prior to prilling, however, transporting and handling of the liquefied version of the minerals creates problems and drastically increases the costs associated with shipping and handling. It would be advantageous to provide compositions and methods for delivery of hygroscopic substances in a dry, flowable form that is readily dissolved or dispersed in water and applied to crops or other applications.

Cellular organisms, such as enzymes, bacteria, and other microorganisms, are typically not sustainable in a dry state. Therefore, these organisms usually must be kept in wet conditions, which, as noted above, creates certain hardships related to their shipping and handling. It would be advantageous to provide compositions and methods for delivery of cellular organisms in a dry form.

Some substances in their liquid states are relatively unstable. For example, substances which are volatile, or substances which contain one or more hydroxyl groups must be used quickly since these unstable liquid substances can lose their efficacy after a few weeks. Therefore, it would be advantageous to provide compositions and methods for delivery of volatile or unstable fluids in a stable state that is shipped in a dry form.

SUMMARY OF THE INVENTION

The present invention is directed to compositions and methods that satisfy at least one of these needs. The present invention relates to compositions and methods of delivering a substance as part of a composition in a dry mode. In one embodiment, the substance can be bacteria, enzymes, other microorganisms, or combinations thereof. In another embodiment, the substance can be a liquid additive that can be either organic or inorganic. As used herein with regards to liquid additives, "organic" means substances related to, derived from, or having properties or characteristic of living things. As used herein with regards to liquid additives, "inorganic" means substances composed of minerals rather than having properties or characteristic of living things. Exemplary liquid additives include liquid food, liquid food additives, liquid biotech agricultural ingredients, conventional liquid agricultural ingredients, liquid human wellness and dietary supplements, and liquid fragrances and beauty products.

One embodiment of the invention is a composition for delivering microorganisms in a dry mode that contains precipitated silica granules having a porous structure, and microorganisms loaded throughout the pores of the precipitated silica granules. In another embodiment, the pores of the precipitated silica define a distribution of pore sizes, where a substantial amount of pores have diameters within the range of 38 to 240 nanometers. In another embodiment, the microorganism can be bacteria, enzymes, fungi, archaea, viruses, algae, plankton, planaria, protists, or combinations thereof. In another embodiment, the microorganism can be a *bacillus* and/or an enzyme. In another embodiment, the composition also includes nutrients loaded throughout the pores of the precipitated silica granules. In another embodiment, the nutrients can be ammonia, nitrogen, ammonium nitrogen, urea, dextrose, dextrin, sugars, or combinations thereof. In another embodiment, the composition has an initial microorganism count, and the composition is operable to maintain approximately 50 to 400% of the initial microorganism count for a period of time, preferably at least 45 days.

In another embodiment, the composition for delivering microorganisms in a dry mode can be practiced without zeolites, aluminosilicates, mineral powder, and/or an acidic polymer. In one embodiment, the composition is operable to breakdown hydrocarbon deposits in water or soil when applied in a dry state. In another embodiment, the composition can also include nutrients loaded in the precipitated silica granules, such that the nutrients are in contact with the microorganisms, wherein the nutrients are operable to provide a food source to the microorganisms loaded throughout the pores of the precipitated silica granules to enhance propagation of the microorganisms. As used herein, propagation refers to the ability of a substance to reproduce.

In another embodiment, a composition for delivering volatile fluids in a dry mode contains precipitated silica granules having a porous structure, and volatile fluids loaded throughout the pores of the precipitated silica granules, the composition having 25 to 75% volatile fluid concentration by weight, the composition operable to maintain approximately 50 to 100% of volatile fluid concentration for a period of time, preferably at least 45 days, more preferably at least 90 days, wherein the volatile fluid has a vapor pressure of at least 0.03 atm at 25° Celsius. As used herein, the term "fluid" is to be understood to include liquids, plasmas, and gases. In another embodiment, the volatile fluid has a vapor pressure of at least 0.08 atm at 25° Celsius. Exemplary volatile liquids include, without limitation, alcohols, gasoline, diesel fuel.

Another embodiment is a composition for delivering essential oils in a dry mode that contains precipitated silica granules having a porous structure and an essential oil loaded throughout the pores of the precipitated silica granules, the composition having 25 to 75% essential oil concentration by weight, the composition operable to maintain approximately 50 to 100% of the essential oil concentration for a period of at least 45 days. Exemplary essential oils include, but are not limited to, agar oil, ajwain oil, *angelica* root oil, anise oil, asafetida, balsam oil, basil oil, bay oil, bergamot oil, black pepper, buchu oil, birch, camphor, *cannabis* flower, caraway oil, cardamom seed oil, carrot seed oil, cedarwood oil, chamomile oil, *calamus* root, cinnamon oil, *cistus, citronella* oil, clary sage, clove leaf oil, coffee, clove leaf oil, coriander, costmary oil, *costus* root, cranberry seed oil, cubeb, cumin oil, cypress, cypriol, curry leaf, davana oil, dill oil, elecampane, *eucalyptus* oil, fennel seed oil, fir, frankincense oil, galangal, galbanum, *geranium* oil, ginger oil, goldenrod, grapefruit oil, henna oil, *helichrysum*, horseradish oil, hyssop, Idaho tansy, jasmine oil, juniper berry oil, lavender oil, *laurus nobilis, ledum*, lemon oil, lemongrass, lime, *litsea cubeba* oil, mandarin, marjoram, *melaleuca, Melissa* oil (lemon balm), *menthe arvensis*, mountain savory, mugwort oil, mustard oil, myrrh oil, myrtle, neem tree oil, neroli, nutmeg, orange oil, oregano oil, orris oil, palo santo, parsley oil, patchouli oil, *perilla* essential oil, pennyroyal oil, peppermint oil, petitgrain, pine oil, *ravensara*, red cedar, roman chamomile, rose oil, rosehip oil, rosemary oil, rosewood oil, sage oil, sandalwood oil, sassafras oil, savory oil, *schisandra* oil, spearmint oil, spikenard, spruce, star anise oil, tangerine, tarragon oil, tea tree oil, thyme oil, tsuga, turmeric, valerian, vetiver oil, western red cedar, wintergreen, yarrow oil, ylang-ylang, zedoary, and combinations thereof.

In another embodiment, a composition for delivering a hygroscopic compound in a dry mode that maintains flow contains precipitated silica granules having a porous structure, and the hygroscopic compound is loaded throughout the pores of the precipitated silica granules, the composition having 25 to 75% hygroscopic compound concentration by weight, the composition operable to maintain approximately 75 to 100% of the hygroscopic compound concentration for a period of time, preferably at least 45 days, wherein the composition is soluble in water and the composition maintains its ability to readily flow. In another embodiment, the composition can have more than one hygroscopic compound. In another embodiment, the composition is not hygroscopic.

In another embodiment, the composition contains precipitated silica granules having silica pores, and a liquid additive loaded into the precipitated silica granules, wherein the average pore diameter of the liquid additive's molecules is less than the average diameter of the silica pores, and wherein the composition is operable to reduce contaminants from a contaminated area. In another embodiment, the liquid additive is bacteria, nutrients, or combinations thereof, the contaminated area is soil, water, or air, and the contaminants are sewage, oil, pollutants, or combinations thereof. In another embodiment, the composition is formed without the use of a reaction. In another embodiment, the composition is formed without chemically altering the surface of the precipitated silica granules. In another embodiment, the composition is substantially dry such that it can readily flow. In one embodiment, the composition can exhibit an angle of repose between 29.9° and 42°. In one embodiment, the angle of repose can be determined by pouring the composition through a funnel and allowing the composition to fall onto a base board, thereby forming a conical mound. A portion of the base board can then be removed from underneath a portion of the conical mound. The angle formed by the edge of the board can be measured using a straight edge and reading the angle.

In another embodiment, the invention relates to the use of precipitated silica granules as a delivery agent for the substance in a dry mode. In an embodiment, if the substance is in solid form, then the substance can be liquefied by melting or dissolving the substance in a carrier fluid, for example, water, alcohol, or acetone. Once the substance is in a liquid state, the substance can be directly added and mixed with precipitated silica granules such that the substance infuses throughout the precipitated silica granules to form a loaded product. This loaded product can then be combined with other products or mixes and used in a wide range of products. Advantageously, substances which are hygroscopic, can be liquefied and loaded into precipitated silica granules, thereby allowing for handling in a dry mode. Additionally, different types of hygroscopic materials can be liquefied together to form a liquid blend that is well mixed to improve overall consistency. This liquid blend can be added to the precipitated silica, thereby allowing for the production of a loaded product that is highly consistent. Similarly, substances such as enzymes, bacteria, other microorganisms, nutrients, and combinations thereof, which are usually kept in a wet condition to maintain viability, can be loaded into precipitated silica, thereby allowing for handling in a dry mode.

In another embodiment, an additional benefit is that the loaded product has an increased shelf life and/or can provide additional stability not accomplishable in a fluid state. For example, substances which are volatile, or substances which contain one or more hydroxyl groups. These unstable fluid substances often times can lose their efficacy after a few weeks, which means the end user must use the fluid substances quickly. In certain embodiments, these relatively unstable fluid substances can be loaded into precipitated silica to increase their shelf life and/or provide additional stability not accomplishable in a fluid state. In one embodiment, the shelf life of the composition can be at least two years. As used herein, shelf life generally means the recommendation of time that products can be stored, during which the defined quality of a specified proportion of the goods remains acceptable under expected (or specified) conditions of distribution, storage and display. Some substances in their fluid states are relatively unstable.

In another embodiment, microbes, live cultures, and nutrients can be delivered in a dry format. In another embodiment, the delivery of these cultures and nutrients can be achieved by loading precipitated silica with the cultures and nutrients, together or separately, to a desired capacity then applying the loaded product to the contamination on the water or in the soil. In another embodiment, the invention is applicable to spills, such as sewage, oil or other type of chemical contaminations on water since the loaded precipitated silica adheres to the contaminate and keeps the cultures in direct contact with their food source, unlike liquid applications that may disperse without adhering to the contaminate. Embodiments of the present inventions can be also applicable to waste within landfills. Additional benefits can also be seen in microbe propagation (factors from ~1.5 to about 15 have been observed) and in the time release effects when the microbes are released over a period of time versus all at once in a liquid.

Examples of liquid food additives include, without limitations, enzymes, bacteria, probiotics, oleoresin, flavors, minerals, plant extracts and preservatives. In one embodiment, the delivery of these ingredients is achieved by loading precipitated silica, preferably food-grade, with the liquid ingredient(s), together or separately, to a desired capacity to form a loaded product. The loaded product can then be applied to a larger formulated recipe or packaged for later application or hydration. In other embodiments, the invention is applicable to concentrated ingredients such as extracts of all kinds, minerals, chelated minerals, vinegars, wine, soy sauce, pepper sauce, olive oil, essential oils, flavors and formulated liquid foods. Exemplary enzymes for liquid food additives include protease, amylase, cellulose, lipase, yeast.

Examples of liquid biotech agricultural ingredients include, without limitation, enzymes, bacteria, nutrients, wetting agents, and minerals. The delivery of these ingredients is achieved by loading precipitated silica with the liquid ingredient(s), together or separately, to a desired capacity then applying the loaded product to a larger formulated recipe or packaged for later application or hydration. In another embodiment, the invention is applicable to concentrated ingredients such as enzymes, bacteria nutrients and minerals. In one embodiment, liquid biotech agricultural ingredients are advantageous for treating "organic" produce or in the application and formulation of fertilizers, pesticides, herbicides, and the like.

Examples of conventional liquid agricultural ingredients include, without limitation, urea, potassium citrate, monopotassium phosphate, potassium chloride, magnesium chloride, sulfates, nutrients and minerals. The delivery of these ingredients is achieved by loading precipitated silica with the liquid ingredient(s), together or separately, to a desired capacity then applying the loaded product to a larger formulated recipe or packaged for later application or hydration. In another embodiment, the invention is applicable to concentrated ingredients such as, zinc, manganese, magnesium, boron, potassium, and phosphorus. In one embodiment, carbon, in either plant or non-plant based, can also be added to the composition. Advantageously, a pH value between 6.0 to 6.5 allows for improved propagation of any microbes or bacteria that may be in the loaded product.

Examples of liquid human wellness and dietary supplements include, without limitation, essential oils and plant extracts, such as fish oil and other dietary items. The delivery of these ingredients is achieved by loading precipitated silica with the liquid ingredient(s), together or separately, to a desired capacity then applying the loaded product to a larger formulated recipe or packaged for later application or hydration. In another embodiment, the invention is applicable to concentrated ingredients such as, fish oils, amino acids, proteins and other supplements.

Examples of liquid media mixes for life sciences products include, without limitation, media mix elements such as blood media, soy media, sugar media, starch media and other similar media. In another embodiment, the delivery of these ingredients is achieved by loading precipitated silica with the liquid ingredient(s), together or separately, to a desired capacity then applying the loaded product to a larger formulated recipe or packaged for later application or hydration.

Examples of liquid fragrances and beauty products include, without limitation, essential oils and plant extracts, such as fragrances, amino acids, and glycolic acids. In another embodiment, the delivery of these ingredients is achieved by loading precipitated silica with the liquid ingredient(s), together or separately, to a desired capacity then applying the loaded product to a larger formulated recipe or packaged for later application or hydration. In another embodiment, the invention is applicable to concentrated ingredients such as fragrances, acids and oils.

Another embodiment of the invention is a method for bioremediation. This method includes loading precipitated silica granules with a liquid substance to a desired capacity to form a loaded product, and applying the loaded product to an area having contaminants, such that the loaded product adheres to the contaminants and subsequently converts the contaminants into gaseous products and water thereby eliminating the contaminants from the area. In another embodiment, the liquid substance is microbes, nutrients, or combinations thereof. In another embodiment, the area is water or soil. In another embodiment, the contaminants are sewage, oil, or combinations thereof.

The present invention provides many benefits over conventional liquid additives including ease of use, lower shipping cost, ease of transportation, and reduced storage requirements.

DETAILED DESCRIPTION OF EMBODIMENTS OF THE PRESENT INVENTION

Embodiments of the present invention allow for the delivery of substances in a dry mode. In its most basic format, a predetermined amount of substance, if initially in liquid format, is added to an amount of precipitated silica and mixed to form a loaded product. If the substance is initially in a dry format, the substance can be liquefied by various means known in the art and then added to an amount of precipitated silica and mixed to form a loaded product. The loaded product has the consistency of a dry, sand-like substance. The loaded product includes the precipitated silica granules and the liquid additive loaded throughout the precipitated silica granules' inner and outer surfaces. The loaded product contains the characteristics of the substance, yet is dry to the touch. In some embodiments, the loaded product can then be combined with other ingredients or hydrated with water to form the final product. In another embodiment, the process can also include extracting the loaded substance from the loaded product and separating the precipitated silica granules from the loaded substance prior to rehydration in order to reduce the total concentration of precipitated silica granules in the final product.

In one embodiment of the invention, a composition for delivering microorganisms in a dry mode contains precipitated silica granules having a porous structure, and microorganisms loaded throughout the pores of the precipitated silica granules. In another embodiment, the pores of the precipitated silica have diameters within the range of 38 to 240 nanometers. In another embodiment, the microorganisms are selected from the group of bacteria, enzymes, fungi, archaea, viruses, algae, plankton, planaria, protists, and combinations thereof. In another embodiment, the composition can also include nutrients loaded throughout the pores of the precipitated silica granules. In another embodiment, the nutrients are selected from the group consisting of ammonia, nitrogen, ammonium nitrogen, urea, dextrose, dextrin, sugars, and combinations thereof. In another embodiment, the composition has an initial microorganism count, and the composition is operable to maintain approximately 75 to 400% of the initial cellular organism count for a period of time, preferably at least 45 days.

The characteristics of typical precipitated silica granules are as follows: pore size range from 38-240 nanometers and a particle size of 10-1400 microns. Examples of precipitated silica granules useful as part of the compositions and methods of the present invention are the FLO-GARD® or HI-SIL® silicon dioxide products obtained from PPG Industries, Inc. Precipitated silica granules may also be obtained from other providers, such as for example, W.R. Grace and Company. Another characteristic of typical precipitated silica granules is a surface area of from about 140 to about 160 square meters per gram.

Examples of microorganisms to be used in this invention are bacteria, enzymes, fungi, archaea, viruses, algae, plankton, planaria, protists, and combinations thereof.

Examples of bacteria include without limitations: *bacillus*, prokaryotes and eukaryotes, gram positive and gram negative, Actinobacteria, Firmicutes, Tenericutes, Aquificae, Bacteroidetes/Chlorobi, Chlamydiae/Verrucomicrobia, Deinococcus-Thermus, Fusobacteria, Gemmatimonadetes, Nitrospirae, Proteobacteria, Spirochaetes, Synergistetes, Acidobacteria, Chloroflexi, Chrysiogenetes, Cyanobacteria, Deferribacteres, Dictyoglomi, Fibrobacteres, Planctomycetes, Thermodesulfobacteria, Thermotogae, *B. alvei, B. amyloliquefaciens, B. anthracis, B. cereus, B. circulans, B. coagulans, B. globigii, B. infernus, B. larvae, B. laterosporus, B. licheniformis, B. megaterium, B. mucilaginosus, B. natto, B. polymyxa, B. pseudoanthracis, B. pumilus, B. sphaericus, B. sporothermodurans, B. stearothermophilus, B. subtilis, B. thuringiensis*, and combinations thereof.

Examples of exemplary bacteria particularly useful for bioremediation applications include without limitations: pseudomonads, flavobacteriaceaes, and *bacillus, Pseudomonas fluorescence, Pseudomonas aeruginosa, Pseudomonas putida, Pseudomonas alcoligenes, Flavobacterim, Arthrobacter cumminsii, Alconivorax borkumensis, Vibrio parahaemolyticus*, and combinations thereof.

Examples of exemplary acid producing bacteria include without limitations: *Enterococcus faecium, Streptococcus faecium, Pediococcus acidilactici, Lactobacillus acidophilus, Lactobacillus plantarum*, and combinations thereof.

Enzymes are proteins that catalyze chemical reactions. Examples of enzymes include without limitations: acetolactatedecarboxylases, amylases, amyloglucosidases, anhydrases, arabinoxylanases, betaglucanases, carboxylases, catalases, cellulases, cyclases, dehydrogenases, dismuates, glucanases, glucoamylases, hydrolases, hydroxylases, isomerases, kinases, laccases, lactases, ligninases, luciferases, ligases, lipases, lyases, oxidases, oxidoreductrases, pectinases, phosphatases, proteases, pullulanases, reductases, rennin, transferases, transaminases, thiaminases, synthases, xylanases, DNA polymerases, DNA ligases, ceruloplasmin, restriction enzymes, papain, and combinations thereof.

Examples of fungi include without limitations: Blastocladiomycota, Chytridiomycota, Glomeromycota, Microsporidia, Neocallimastigomycota, Dikarya, Deuteromycota, Ascomycota, Pezizomycotina, Saccharomycotina, Taphrinomycotina, Basidiomycota, Agaricomycotina, Pucciniomycotina, Ustilaginomycotina, Subphyla Incertae sedis, Entomophthoromycotina, Kickxellomycotina, Mucoromycotina, Zoopagomycotina, and combinations thereof.

Examples of archaea include without limitations: Crenarchaeota, Euryarchaeota, Korarchaeota, Nanoarchaeota, Thaumarchaeota, and combinations thereof.

Examples of viruses include without limitations: dsDNA viruses: families: Myoviridae, Podoviridae, Siphoviridae, Alloherpesviridae, Herpesviridae, Malacoherpesviridae, Ascoviridae, Adenoviridae, Asfarviridae, Baculoviridae, Coccolithoviridae, Corticoviridae, Fuselloviridae, Guttaviridae, Iridoviridae, Lipothrixviridae, Nimaviridae, Papillomaviridae, Phycodnaviridae, Plasmaviridae, Polyomaviridae, Poxviridae, Rudiviridae, Tectiviridae, and Mimiviridae, and genera: Ampullavirus, Nudivirus, Salterprovirus, Sputnik virophage, and Rhizidiovirus; ssDNA viruses: families: Inoviridae, Microviridae, Geminiviridae, Circoviridae, Nanoviridae, and Parvoviridae, and genera Anellovirus; dsRNA viruses: families: Birnaviridae, Cystoviridae, Hypoviridae, Partitiviridae, Reoviridae, and Totiviridae, and genera Endornavirus; (+)ssRNA viruses: families: Arteriviridae, Coronaviridae, Roniviridae, Dicistroviridae, Iflaviridae, Marnaviridae, Piconaviridae, Secoviridae, Alphaflexiviridae, Betaflexiviridae, Gammaflexiviridae, Tymoviridae, Astroviridae, Barnaviridae, Bromoviridae, Caliciviridae, Closteroviridae, Flaviviridae, Leviviridae, Luteoviridae, Narnaviridae, Potyviridae, Tetraviridae, Togoviridae, and Tombusviridae, and genera: Benyvirus, Furovirus, Hepevirus, Hordeivirus, Idaeovirus, Ourmiavirus, Pecluvirus, Pomovirus, Sobemovirus, Tobamovirus, Tobravirus, and Umbravirus; (−)ssRNA viruses: families: Bornaviridae, Filoviridae, Paramyxoviridae, Rhabdoviridae, Arenaviridae, Bunyaviridae, and Orthomyxoviridae, and genera: Deltavirus. Nyavirus, Ophiovirus, Tenuivirus, and Varicosavirus; ssRNA-RT viruses: families: Metaviridae, Pseudoviridae, and Retroviridae; dsDNA-RT viruses: families: Hepadnaviridae and Caulimoviridae, and combinations thereof.

Examples of algae include without limitations: Archaeplastida, Chlorophyta, Rhodophyta, Glaucophyta, Rhizaria, Excavata, Chlorarachniophytes, Euglenids, Chromista, Alveolata, Heterokonts, Bacillariophyceae, Axodine, *Bolidomonas*, Eustigmatophyceae, Phaeophyceae, Chrysophyceae, Raphidophyceae, Synurophyceae, Xanthophyceae, Cryptophyta, Dinoflagellates, Haptophyta, and combinations thereof.

Examples of plankton include without limitations: phytoplankton, autotrophic, prokaryotic or eukaryotic algae, cyanobacteria, dinoflagellates and coccolithophores, zooplankton, small protozoans or metazoans, bacterioplankton, and combinations thereof. The equivalent spherical diameter of the plankton contemplated as part of this inventions is typically under 240 nanometers.

Examples of planaria include without limitations: *Dugesia tigrina, Planaria maculate, Dugesia dorotocephala, Schmidtea mediterranea*, and combinations thereof.

Examples of protists include without limitations: Chromalveolata, Heterokontophyta, Haptophyta, Cryptophyta, Alveolata, Dinoflagellata, Apicomplexa, Ciliophora, Excavata, Euglenozoa, Percolozoa, Metamonada, Rhizaria, Radiolaria, Foraminifera, Cercozoa, Archaeplastida, Rhodophyta, Glaucophyta, Unikonta, Amoebozoa, Choanozoa, and combinations thereof.

What follows is an example of how one can load microorganisms into precipitated silica granules. 700 ml of microorganisms *B. subtilis* in a fluid media with a count of 31 million cfu/g is introduced by evenly distributing fluids over dry substances, using a stainless steel ribbon blender to 270 g of FLO-GARD SC72C precipitated silica granules. The subsequent mixture is stirred until all liquid media is substantially loaded into the precipitated silica granules. Nutrients can be blended with the microorganisms prior to being loaded with the precipitated silica or they may be loaded into separate precipitated silica stock so that the amount of nutrients in the precipitated silica granule is modified as needed. The temperature of the mixtures can be maintained at 10-40° C. The resulting product is dry to the touch within five minutes of the initial introduction of the liquid media. This dry state is reached during the stirring of the combined ingredients and is handled as a dry product immediately upon unloading the mixer. The product can be then stored at room temperature with an improved shelf life.

As used herein, the term "dry mode" means that a liquid is substantially loaded in the precipitated silica granule. One of ordinary skill in the art will understand that this is achieved during the mixing process when a liquid is loaded into the precipitated silica. In one embodiment, after mixing for five minutes, the resulting product is dry to the touch and can be handled as a dry product. Furthermore, the dry product is fully free flowing.

In another embodiment, a composition for delivering volatile fluids in a dry mode contains precipitated silica granules having a porous structure, and volatile fluids loaded throughout the pores of the precipitated silica granules, the composition having 25 to 75% volatile fluid concentration by weight, the composition operable to maintain approximately 75 to 100% of volatile fluid concentration for a period of at least 45 days, wherein the volatile fluid has a vapor pressure of at least 0.03 atm at 25° Celsius. In another embodiment, a composition for delivering essential oils in a dry mode contains precipitated silica granules having a porous structure, and an essential oil loaded throughout the pores of the precipitated silica granules, the composition having 25 to 75% essential oil concentration by weight, the composition operable to maintain approximately 75 to 100% of essential oil concentration for a period of at least 45 days.

In another embodiment, a composition for delivering a hygroscopic compound in a dry mode that maintains flow contains precipitated silica granules having a porous structure, and the hygroscopic compound loaded throughout the pores of the precipitated silica granules, the composition having 25 to 75% hygroscopic compound concentration by weight, the composition operable to maintain approximately 75 to 100% of the hygroscopic compound concentration for a period of at least 45 days, wherein the composition is soluble in water.

In another embodiment, a composition for delivering a liquid additive in a dry mode contains precipitated silica granules having silica pores, and a liquid additive loaded into the precipitated silica granules, wherein the average pore diameter of the liquid additive's molecules is less than the average diameter of the silica pores, wherein the composition is operable to reduce contaminants from a contaminated area. In another embodiment, the liquid additive is selected from the group of bacteria, nutrients, and combinations thereof; the contaminated area is selected from the group consisting of soil, water, and air; and the contaminants are selected from the group consisting of sewage, oil, pollutants, and combinations thereof. In another embodiment, the composition is formed without the use of a reaction. In another embodiment, the composition is formed without chemically altering the surface of the precipitated silica granules. In another embodiment, the composition is substantially dry such that it can readily flow. In another embodiment, the composition is not hygroscopic.

In another embodiment, the substances can be bacteria, enzymes, other microorganisms, and combinations thereof. In another embodiment, the substances are liquid additives that can be organic or inorganic, as defined by the USDA's National Organic Program, or combinations thereof. Exemplary liquid additives include liquid food, liquid food additives, liquid biotech agricultural ingredients, conventional liquid agricultural ingredients, liquid human wellness and dietary supplements, and liquid fragrances and beauty products.

In another embodiment, the invention relates to the use of precipitated silica granules as a delivery agent for the substance in a dry mode. In an embodiment, if the substance is in solid form, then it can be liquefied by either melting or dissolving the substance in a carrier fluid, such as water, alcohol, glycerin, syrup, oil, acetone or other acceptable fluid media. Once the substance is in a liquid state, it is directly added and mixed with precipitated silica granules such that the substance infuses throughout the precipitated silica granules to form a loaded product. This loaded product can then be combined with other products or mixes and used in a wide range of products. Advantageously, substances that are hygroscopic can be liquefied and loaded into precipitated silica, thereby allowing for handling in a dry mode (e.g. no clumping). Additionally, different types of hygroscopic materials can be liquefied together to form a liquid blend that is well mixed to improve overall consistency. This liquid blend can be added to the precipitated silica, thereby allowing for the production of a loaded product that is highly consistent. Similarly, substances such as enzymes, bacteria, other microorganisms, nutrients, and combinations thereof, which are usually kept in a wet condition to maintain viability, can be loaded into precipitated silica, thereby allowing for handling in a dry mode.

In another embodiment, an additional benefit is that the loaded product has an increased shelf life and/or provide additional stability not accomplishable in a fluid state. Some substances in their fluid states are relatively unstable. For example, substances which are volatile, or substances which contain one or more hydroxyl groups. These unstable fluid substances often times can lose their efficacy after a few weeks, which means the end user must use the fluid substances quickly. In certain embodiments, these relatively unstable fluid substances can be loaded into precipitated silica to increase their shelf life and/or provide additional stability not accomplishable in a liquid state.

In another embodiment, microbes, live cultures, and nutrients can be delivered in a dry format. In another embodiment, the delivery of these cultures and nutrients can be achieved by loading precipitated silica with the cultures and nutrients, together or separately, to a desired capacity then applying the loaded product to the contamination on the water or in the soil. In another embodiment, the invention can be applicable to spills, such as sewage, oil or other type of chemical contaminations on water since the loaded precipitated silica adheres to the contaminate and keeps the cultures in direct contact with their food source, unlike liquid applications that may disperse without adhering to the contaminate. Embodiments of the present invention can also be applicable to waste within landfills. Additional benefits can also be, seen in microbe propagation (factors from ~1.5 to about 15 have been observed) and in the time release effects when the microbes are released over a period of time versus all at once in a liquid.

Examples of liquid food additives include enzymes, bacteria, probiotics, oleoresin, flavors, minerals, plant extracts and preservatives. In one embodiment, the delivery of these ingredients can be achieved by loading precipitated silica, preferably food-grade, with the liquid ingredient(s), together or separately, to a desired capacity to form a loaded product. The loaded product can then be applied to a larger formulated recipe or packaged for later application or hydration. In other embodiments, the invention can be applicable to concentrated ingredients such as extracts of all kinds, minerals, chelated minerals, vinegars, wine, soy sauce, pepper sauce, olive oil, essential oils, flavors and formulated liquid foods.

Examples of liquid biotech agricultural ingredients include enzymes, bacteria, nutrients and minerals. The delivery of these ingredients can be achieved by loading precipitated silica with the liquid ingredient(s), together or separately, to a desired capacity then applying the loaded product to a larger formulated recipe or packaged for later application or hydration. In another embodiment, the invention can be applicable to concentrated ingredients such as enzymes, bacteria, nutrients and minerals. In one embodiment, liquid biotech agricultural ingredients are advantageous for treating "organic" produce or in the application and formulation of fertilizers, pesticides, herbicides, etc.

Examples of conventional liquid agricultural ingredients include urea, potassium citrate, monopotassium phosphate, potassium chloride, magnesium chloride, sulfates, nutrients and minerals. The delivery of these ingredients can be achieved by loading precipitated silica with the liquid ingredient(s), together or separately, to a desired capacity then applying the loaded product to a larger formulated recipe or packaged for later application or hydration. In another embodiment, the invention can be applicable to concentrated ingredients such as, zinc, manganese, magnesium, boron, potassium, and phosphorus.

Examples of liquid human wellness and dietary supplements include essential oils and plant extracts, such as fish oil and other dietary items. The delivery of these ingredients can be achieved by loading precipitated silica with the liquid ingredient(s), together or separately, to a desired capacity then applying the loaded product to a larger formulated recipe or packaged for later application or hydration. In another embodiment, the invention can be applicable to concentrated ingredients such as, fish oils, amino acids, proteins and other supplements.

Examples of liquid media mixes for life sciences products include media mix elements such as blood media, soy media, sugar media, starch media and other similar media. In another embodiment, the delivery of these ingredients can be achieved by loading precipitated silica with the liquid ingredient(s), together or separately, to a desired capacity then applying the loaded product to a larger formulated recipe or packaged for later application or hydration.

Examples of liquid fragrances and beauty products include essential oils and plant extracts, such as fragrances, amino acids, and glycolic acids. In another embodiment, the delivery of these ingredients can be achieved by loading precipitated silica with the liquid ingredient(s), together or separately, to a desired capacity then applying the loaded product to a larger formulated recipe or packaged for later application or hydration. In another embodiment, the invention can be applicable to concentrated ingredients such as fragrances, acids and oils.

The present invention provides many benefits over conventional liquid additives including ease of use, lower shipping cost, ease of transportation, and reduced storage requirements.

In an embodiment wherein the substance can be a liquid food additive, the loaded product can be combined with other premixed spices that are found with ready to make soups, gravies, sauces, dips, etc. The loaded product could also be sold in individual packages much like sweeteners or tea bags. In this fashion, liquid food additives could be easily packaged for travel sizes in a dry form. The dry, loaded product provides many benefits over its liquid food additive counterparts. For example, the loaded product increases overall ease of use, eliminates spoilage, increases food preservation and food safety, lowers shipping costs, increases ease of transportation, and reduces storage requirements. Another advantage is that the loaded product does not require the need for cold storage, which eliminates the need for refrigeration when the user is at home or on the go.

Many different liquid food products are encompassed within embodiments of the present invention. Extracts of all kinds, minerals, chelated minerals, vinegars, wine, soy sauce, pepper sauce, alcohol, Worcester Sauces, olive oil, and essential oils are all encompassed by the present invention. Of course, those of ordinary skill in the art will recognize other equivalents as well.

Various food additives were tested with various types of precipitated silica granules. AU precipitated silica granules used were the FLO-GARD® or HI-SIL® silicon dioxide products obtained from PPG Industries, Inc. which has a principle place of business at One PPG Place, Pittsburgh, Pa. 15272. Table I, below, lists specific food additives and preferred granular precipitated silica products, as well as their respective amounts, that is used in accordance with the present invention.

TABLE I

Preparation of Loaded Products Using Various Food Additives

| Food Additive | Amount of Food Additive (ml) | SC-72C (190 microns) | 213 (600 microns) | 233 (18 micron) | Percent Loading |
|---|---|---|---|---|---|
| Organic Soy Sauce | 125 | 39 g | — | — | 76% |

TABLE I-continued

Preparation of Loaded Products Using Various Food Additives

| Food Additive | Amount of Food Additive (ml) | SC-72C (190 microns) | 213 (600 microns) | 233 (18 micron) | Percent Loading |
|---|---|---|---|---|---|
| Vinegar | 205 | — | 85 g | 5 g | 69% |
| Pepper Sauce | 190 | — | 100 g | — | 65% |
| Grain Alcohol | 112 | 40 g | — | — | 73% |
| Honey | 200 | 100 g | — | — | 60% |
| Red Wine | 112 | 39 g | — | — | 74% |
| White Wine | 112 | 39 g | — | 2 g | 73% |
| Olive Oil | 112 | 39 g | — | 3 g | 71% |
| Oleoresins | 100 | 39 g | — | 3 g | 72% |
| Hickory Smoke Flavor | 109 | 39 g | — | 3 g | 72% |
| Iron Mineral | 420 | 150 g | — | 26 g | 65% |

In an embodiment of the invention, the total amount of precipitated silica in the consumable product includes 2% by weight or less. In another embodiment, it is preferred to preheat the liquid food additive to reduce its viscosity to allow for easier flow conditions. For example and without limitation, honey can be preferably heated to about 60° Celsius and the hickory smoke flavor can be preferably heated to about 45° Celsius.

Table II, below, lists specific biotech agricultural additives and preferred granular precipitated silica products, as well as their respective amounts, that can be used in accordance with the present invention.

TABLE II

Preparation of Loaded Products Using Biotech Agricultural Additives

| Food Additive | Amount of Biotech Additive | Water | Nutrients (WPC80) | SC-72C (190 microns) |
|---|---|---|---|---|
| Iron Mineral | 420 ml | — | — | 150 g |
| Organic Crop Production Aid Microbes | 5 lbs | 25 lbs | — | — |
| Organic Crop Production Aid Microbes | 5 lbs | 25 lbs | 0.25 lbs | 20 lbs |

In the second formulation noted in Table II above, the microbes of the loaded product experienced propagation and yielded 1.5 times the original microbe count. As such, embodiments of the present invention can surprisingly result in an increase in the amount of microbes.

Experimental Results

Bioremediation

Six different prep beakers were initially created. The first beaker included 1.25 ml of microbes. The microbes used in this experiment were the M1000H purchased from Micro-Bac. The second beaker was a combination of 300 ml of microbes with 200 ml of precipitated silica granules. The precipitated silica granules used were SC-72C (particle size 190 micron) obtained from PPG Silica. This results in 60% loading. Percent loading is calculated according to the following equation:

$$\% \text{ Loading} = \frac{M_{liquids}}{M_{total}} * 100$$

wherein $M_{liquids}$ is the mass of the liquid solution used and $M_{total}$ is the total mass of the solution, which is simply the summation of liquid mass and mass of precipitated silica granules.

The third beaker included 100 ml of microbes, 400 ml of water. The solution was combined and allowed to sit for 24 hours prior to application. The fourth beaker is a combination of 300 ml from the third beaker and 200 ml of precipitated silica, again with 60% loading. The fifth beaker included 9 ml of raw nutrients and 491 ml of water such that the ratio of nutrients to water was 1:55. The nutrients used for this experiment were the TRIPHASIC 12 nutrients obtained from Micro-Bac. Just as with the third beaker, the solution in the fifth beaker was mixed and allowed to sit for 24 hours. The sixth beaker was a combination of 300 ml from the fifth beaker and 200 ml of precipitated silica granules. Table III below provides a summary of the contents of each beaker.

TABLE III

Components of Each Prep Beaker

| Beaker | Microbes (ml) | Water (ml) | Precipitated silica (ml) | Nutrients (ml) |
|---|---|---|---|---|
| 1 | 1.25 | — | — | — |
| 2 | 300 | — | 200 | — |
| 3 | 100 | 400 | — | — |
| 4 | 60 | 240 | 200 | — |
| 5 | — | 491 | — | 9 |
| 6 | — | 294.6 | 200 | 5.4 |

The solutions of beakers 3 and 4 had a strong odor resembling sewer gases. Approximately 980 ml of tap water was added to six additional beakers. 20 ml of un-used motor oil was then added to each of the six beakers giving a total of 1.0 liter per test beaker. Following approximately 20 minutes of settling, each test beaker had approximately 0.5 cm of oil thickness on the edge. The oil layer appeared to be less thick in the radial center of the beaker than at the beaker's edge. Air bubbles gradually disappeared with slight agitation of the beakers. Beakers were left over night. The six beakers had greatly reduced air bubbles in the oil layer as compared to the previous day. The oil layer within each beaker was consistent with full coverage of the surface and a slight film over the oil layer. Otherwise the beakers appeared unchanged.

The contents of prep beaker one were combined with Test Beaker 1. Approximately 2.1 grams of prep beaker two were combined with Test Beaker 2. 6.25 ml of prep beaker three were added to Test Beaker 3. 10.4 grams of prep beaker four were added to Test Beaker 4. Approximately 6.25 ml of prep beaker three and 5.33 ml from prep beaker five were added to Test Beaker 5. 10.4 g from prep beaker four and 8.9 grams of prep beaker six were added to Test Beaker 6. A table outlining the components in each Test Beaker is found below in Table IV.

TABLE IV

Components of Each Test Beaker

| Test Beaker | Prep Beakers | | | | | |
|---|---|---|---|---|---|---|
|  | 1 | 2 | 3 | 4 | 5 | 6 |
| 1 | 1.25 ml | — | — | — | — | — |
| 2 | — | 2.1 g | — | — | — | — |
| 3 | — | — | 6.25 ml | — | — | — |

TABLE IV-continued

Components of Each Test Beaker

| Test Beaker | Prep Beakers | | | | | |
|---|---|---|---|---|---|---|
|  | 1 | 2 | 3 | 4 | 5 | 6 |
| 4 | — | — | — | 10.4 g | — | — |
| 5 | — | — | 6.25 ml | — | 5.33 ml | — |
| 6 | — | — | — | 10.4 g | — | 8.9 g |

After about two hours, observations were made and are summarized in Table V below:

TABLE V

Observations After Time Elapse of Two Hours

| Test Beaker | Observations after two hours |
|---|---|
| 1 | streaks in the oil |
| 2 | streaks in the oil and precipitated silica granules were completely wet with a consistent color and consistency |
| 3 | droplets of added solution were clustered together |
| 4 | precipitated silica granules were wet throughout |
| 5 | droplets of added microbes were nearly clear and droplets of added nutrients were brownish |
| 6 | precipitated silica granules were not completely wet, but a significant portion of the oil is no longer visible |

Test Beaker 1—after three weeks, droplets of microbes were no longer visible in the oil. A thin and very slightly irregular film layer is present under the oil. Test Beaker 2—the precipitated silica granules appeared to absorb a small portion of the surface oil. There was no active bubbling during the third week. The outside area of the precipitated silica granules continued to expand slightly, and formed a solid "mat" that was suspended directly under the remaining oil layer. Test Beaker 3—droplets of microbes were no longer visible in the oil after three weeks; however, areas that may be the microbes and nutrients were visible in a layer under the oil. Again, no bubbles were observed. Like Test Beaker 1, there was a thin and slightly irregular film layer present under the oil. Test Beaker 4—the precipitated silica granules absorbed a significant amount of the surface oil and the microbes began to create a considerable amount of bubbling in the form of carbon dioxide. The outer edge of the "mat" continued to expand and its edges were streaked with a water ring around the circumference of the mat, with a small amount of oil directly above the mat layer. Test Beaker 5—droplets of microbes and nutrients were not visible in the oil after three weeks; however, areas that may be the microbes and nutrients were visible in a layer under the oil. Again, no bubbles were observed. Like Test Beakers 1 and 3, there was a thin and slightly irregular film layer present under the oil; however, for Test Beaker 5, the layer was more complex. Test Beaker 6—the precipitated silica granules absorbed a significant amount of the surface oil and the microbes began to create a considerable amount of bubbling in the form of carbon dioxide. The outside area of the mat continued to expand and bubble. The mat was suspended underneath the remaining oil. Dark areas were present throughout the surface with visible expansion and darkening. Very little oil remained after three weeks.

Two more test beakers were prepared. Test. Beakers 7 and 8 contained 995 ml of water and 5 ml of motor oil (rather than 980 ml and 20 ml as used in Test Beakers 1-6). 300 ml of microbes were added to prep beaker A and aerated for 24 hours. A diluted solution of nutrients was prepared in prep beaker B. The diluted solution had a ratio of 1:55 nutrients to water. 1.25 ml of the aerated microbes from prep beaker A and 5.3 ml of diluted nutrients from prep beaker B were add to Test Beaker 7. Another 1.25 ml from prep beaker A was added to approximately 0.49 g of precipitated silica granules, yielding a loaded product that is 72 percent loaded. The loaded product was then added to Test Beaker 8. Subsequently, 5.3 ml of the diluted nutrient solution from prep beaker B was then added to Test Beaker 8.

Observations were made the following day and are summarized in Table VI below:

TABLE VI

Observations for Test Beakers 7 and 8 after One Day

| Test Beaker | Observations after one day |
|---|---|
| 7 | droplets of microbes and nutrients are no longer separated from the oil; slight streaking of the oil slick |
| 8 | a chunk of the precipitated silica granules appeared to absorb oil and water and sink; oil on the surface has separated into small droplets and the precipitated silica granules--less of a slick and more individual oil droplets |

Test Beaker 7—after two weeks, droplets of microbes and nutrients were not visible in the oil; however, areas that may be the microbes and nutrients were visible in the layer under the oil. Test Beaker 8—after two weeks, the precipitated silica granules absorbed some of the surface oil and is suspended in the remaining surface oil. The microbes appeared to be in direct contact with the oil. Very little oil remained on the surface.

The observations clearly show that three out of the four Test Beakers containing the loaded precipitated silica granules outperformed the Test Beakers that did not contain the loaded precipitated silica granules. Table VII provides results of TPH measurements in each of the eight beakers.

TABLE VII

TPH counts

| Water Sample Beaker | TPH |
|---|---|
| 1 | 5.6 |
| 2 | 3.7 |
| 3 | 6.4 |
| 4 | 11 |
| 5 | 180 |
| 6 | 14 |
| 7 | 57 |
| 8 | 3.7 |

EXAMPLES

Example 1

Preparation of the Precipitated Silica Granules Loaded with *B. Subtilis*

700 ml of microorganisms *B. subtilis* in a liquid media with a count of 31 million cfu/g was introduced through a fine mist spray technology, that evenly distributes liquids over dry substances, using a stainless steel ribbon blender to 270 g of FLO-GARD SC72C precipitated silica granules. The subsequent mixture was stirred until all liquid media was substantially loaded into the precipitated silica granules. Nutrients were blended with the microorganisms prior to being loaded with the precipitated silica; however, they may be loaded into separate precipitated silica stock so that amount of nutrients in the precipitated silica granule can be modified as needed. The temperature of the mixtures was maintained at 10-40° C. The resulting product was dry to the touch within five minutes of the initial introduction of the liquid media. This dry state was reached during the stirring of the combined ingredients and was handled as a dry product immediately upon unloading the mixer. The product can be then stored at room temperature. The activity of microorganisms contained in the precipitated silica granules were measured.

The way the activity of a microorganism can be measured depends on the microorganism. For example, for *B. subtilis*, a method to measure its activity was as follows. An 11 gram sample was diluted and plated serially from 100 to 1,000,000. A 0.1 mL portion of each dilution was then placed onto an MYP agar plate and spread on the surface. It was then incubated for 72 hours at 30° C. Suspect colonies were then confirmed and reported as the confirmed colonies CFU/g (see FDA Bacteriolog. Analytical Manual, 8th Ed. Ch. 14 (this method was originally developed to measure *B. cereus* but was modified according to the Gorton Industries Protocol to measure *B. subtilis*)). Table VIII below describes the results of those measurements.

TABLE VIII

Bacillus Counts Over Time

| Days After Preparation | Bacillus Count (xMM) |
|---|---|
| 1 | 200 |
| 10 | 210 |
| 20 | 310 |
| 30 | 230 |

Example 2

Preparation of Nutrients Loaded Precipitated Silica Granules

A 55:1 dilution of Tri-Phasic-12™ was prepared. Tri-Phasic-12™ was obtained from Micro-Bac International, Inc., 3200 N. IH-35, Round Rock, Tex. 78681-2410. The diluted solution had a ratio of 1:55 nutrients to water. 522.1 ml of diluted nutrients was added to 206.8 g of precipitated silica granules into a stainless steel blender, yielding a loaded product that is 72% loaded.

Example 3

Performance of Composition in Treating Contaminated Soil

Total Petroleum. Hydrocarbon (TPH TX1005) testing was performed on samples, provided to Austin Analytical of Austin, Tex. Screened topsoil was prepared in three separate sample groups: "A"—*B. subtilis* loaded precipitated silica granules (prepared according to Example 1 above), "B"—M-1000CO™ treatment (where the soil was treated with M-1000CO™—obtained from Micro-Bac International, Inc., 3200 N. IH-35, Round Rock, Tex. 78681-2410), and "C"—the control group which had no treatment. Each test group contained 6000 cubic inches of soil mixed with 33.25 fluid oz of crude oil. After the crude oil was added to sample "A", 171.4 g of *B. subtilis* loaded precipitated silica granules and 728.9 g of nutrients loaded precipitated silica granules (prepared according to Example 2 above) were mixed evenly throughout the sample. The entire "A" sample was then divided between 12 (3-5 gallon) plastic planting pots. After the crude oil was added to sample "B", 123.1 ml of M-1000CO™ liquid product and 522.1 ml of Tri-Phasic-12™ were mixed evenly throughout the sample. The entire "B" sample was then divided between 12 (3-5 gallon) plastic planting pots. After the crude oil was added to sample "C", the entire "C" sample was then divided between 12 (3-5 gallon) plastic planting pots as a control. Samples of each test lot were taken before adding the crude oil, after adding the crude oil and weekly after the treatment. Sample sizes are two 4 oz sealed containers.

Example 4

Performance of Composition Containing Volatile Agent 100 ml of Lemon Oil was blended with 39 g of FLO-GARD SC72C precipitated silica in a stainless steel blender for five minutes. The resulting product transitioned from a liquid state to a completely dry mode during the five minute blending period and was placed in sample containers. The Kahlua loaded precipitated silica granules was also prepared by blending 126 ml of Kahlua with 39 g of FLO-GARD SC72C precipitated silica and blended for five minutes. The resulting product also transitioned from a liquid state to a dry mode during the five minute blending period and was placed in sample containers. Both the Lemon Oil and Kahlua samples were tested by The Food Tech Group of Dallas, Tex. and the results are indicted in Table IX below.

TABLE IX

| Observations of Performance of Composition Containing Volatile Agent | | | |
|---|---|---|---|
| Volatile Sample Lots | Oil/Alcohol In Original Sample | Loaded Sample | % Retained |
| Lemon Oil | 56.2% | 31.8/*44.2% | 79% |
| Kaluha Alcohol | 15.11% | 9.34/*12.97% | 86% |

Example 5

Performance of Composition in Treating Contaminated Water 106 liters of water is placed into three (A,B,C) identical metal drums with agitation devices. Samples is taken from each drum and analyzed by Austin Analytical of Austin, Tex. Subsequently, 33.25 oz of crude oil is added to each of the three (A,B,C) drums containing water. After the crude oil is added to test drum "A", 184.4 g of *B. subtilis* loaded precipitated silica granules (prepared according to Example 1 above) and 784.4 g of nutrients loaded precipitated silica granules (prepared according to Example 2 above) is applied evenly across the surface of the test drum. After the crude oil is added to test drum "B", 132.5 ml of Micro-Bac 1000C liquid product and 561.8 ml of Micro-Bac nutrients is applied evenly across the surface of the test drum. After the crude oil is added to test drum "C", no further treatment is applied to the control test drum "C."

Example 6

*Bacillus* Counts 148 ml of liquid microorganisms was blended with 80 g of FLO-GARD 210 and 2 g of FLO-GARD 233 for five minutes in a stainless steel blender. The resulting loaded product also transitioned from a liquid state to a dry mode during the five minute blending period and was placed in sample containers. Liquid samples of Micro-Bac 1000H were also placed in 240 ml sample containers. Samples were analyzed by Eurofins of DesMonines, Iowa using a 72 hr *bacillus* enumeration method. Table X below indicates the results.

TABLE X

| Observed Bacillus Counts | | |
|---|---|---|
| Sample Lots | Bacillus Count (MM) | % Increase |
| Loaded Product | 90 | 473% |
| Micro-Bac | 19 | — |

Example 7

Composition Shelf-Life 700 ml of microorganisms in a liquid media were blended with 270 g of FLO-GARD SC72C precipitated silica for five minutes in a stainless steel blender. The resulting product also transitioned from a liquid state to a dry mode during the five minute blending period and was placed in sample containers marked from lot "A" through lot "O." Samples were analyzed by Eurofins of DesMonines, Iowa using a 72 hr *bacillus* enumeration method. Lot "A" was measured week 1, "B" week 2 and so on through lot "O." Table XI below indicates the results.

TABLE XI

| Observed Bacillus Counts | |
|---|---|
| Sample Lots | Bacillus Count (MM) |
| A | 210 |
| B | 210 |
| C | 150 |
| D | 310 |
| E | 200 |
| F | 140 |
| G | 100 |
| H | 20 |
| I | 50 |
| J | 230 |

Example 8

Food/Flavor Compositions

Soy Sauce—139 ml of Tamari Soy Sauce liquid was blended with 39 g of FLO-GARD SC72C precipitated silica for five minutes in a stainless steel blender. The resulting product also transitioned from a liquid state to a dry mode during the five minute blending period and was placed in sample containers marked Tamari Soy Sauce. Vinegar—186 ml of Vinegar liquid was blended with 100 g of FLO-GARD 213 precipitated silica for five minutes in a stainless steel blender. The resulting product also transitioned from a liquid state to a dry mode during the five minute blending period and was placed in sample containers marked Vinegar. Red Wine—112 ml of red wine liquid was blended with 45 g of FLO-GARD SC72C precipitated silica for five minutes in a stainless steel blender. The resulting product also transitioned from a liquid state to a dry mode during the five minute blending period and was placed in sample containers marked Red Wine. White Wine—112 ml of white wine liquid was blended with 45 g of FLO-GARD SC72C precipitated silica for five minutes in a stainless steel blender. The resulting product also transitioned from a liquid state to a dry mode during the five minute blending period and was placed in sample containers marked White Wine. Arosmoke Hickory Smoke Flavor—109 ml of smoke flavor liquid was blended with 39 g of FLO-GARD SC72C precipitated silica for five minutes in a stainless steel blender. The resulting product also transitioned from a liquid state to a dry mode during the five minute blending period and was placed in sample containers marked Arosmoke Hickory Smoke Flavor. Olive Oil—95 ml of olive oil liquid was blended with 39 g of FLO-GARD SC72C precipitated silica for five minutes in a stainless steel blender. The resulting product also transitioned from a liquid state to a dry mode during the five minute blending period and was placed in sample containers marked Olive Oil. Everclear Gain Alcohol—112 ml of grain alcohol liquid was blended with 40 g of FLO-GARD SC72C precipitated silica for five minutes in a stainless steel blender. The resulting product also transitioned from a liquid state to a dry mode during the five minute blending period and was placed in sample containers marked Everclear Gain Alcohol. Pure Vanilla Extract—102 ml of pure vanilla extract liquid was blended with 39 g of FLO-GARD SC72C precipitated silica for five minutes in a stainless steel blender. The resulting product also transitioned from a liquid state to a dry mode during the five minute blending period and was placed in sample containers marked Pure Vanilla Extract. Caramelized Sugar Syrup—107 ml of caramelized sugar syrup liquid was heated to 60° Celsius and blended with 42 g of FLO-GARD SC72C precipitated silica for five minutes in a stainless steel blender. The resulting product also transitioned from a liquid state to a dry mode during the five minute blending period and was placed in sample containers marked Caramelized Sugar Syrup. Maximum loading for the FLO-GARD 213 was 65% and 75% for FLO-GARD SC72C but for the purposes of these test, the loading of the FLO-GARD SC72C was maintained at 72%.

Example 9

Enzyme Composition

Rennet—72 ml of liquid rennet was blended with 30 g of FLO-GARD SC72C precipitated silica for five minutes in a stainless steel blender. The resulting product also transitioned from a liquid state to a dry mode during the five minute blending period and was placed in sample containers marked Rennet. Dairy Manufacturers Lab conducted testing on the samples to verify enzyme activity levels. 2 g of rennet loaded precipitated silica granules were combined with the water and powdered low heat non-fat skim mixture and allowed to stand for 5 minutes. The resulting product was a solidified cheese mass that proved that the rennet had been released from the precipitated silica into the milk mixture to form the cheese.

Example 10

Composition of Hygroscopic Compounds

Prilled urea, potassium citrate, and monopotassium phosphate were micronized through the use of a hammer mill. Potassium chloride (0.1 lb) and magnesium chloride (0.02 lb) were combined with the micronized urea (0.4 lb), potassium citrate (0.38 lb) and monopotassium phosphate (0.1 lb) in a small sample bag and was left overnight. After 12 hours, the resulting blend had transformed into an unusable semi-hard gel like mixture that would not dissolve in water. After the results of the initial test were realized, potassium chloride (7 lbs) and magnesium chloride (1.4 lbs) were added to 8 gallons of water. The micronized urea (28 lbs), potassium citrate (26.6 lbs) and monopotassium phosphate (7 lbs) were then added to the same 8 gallons of water and the mixture blended for 30 minutes until all ingredients were suspended in the liquid solution. FLO-GARD SC72C (59 lbs) was added to a stainless steel blender along with the liquid solution of potassium chloride, magnesium chloride, and micronized urea (28 lbs), potassium citrate (26.6 lbs) and monopotassium phosphate. The mixture was blended for five minutes. The resulting product also transitioned from a liquid state to a dry mode during the five minute blending period and was placed in sample paper bags for field testing. Paper bags were used to validate the products ability to retain the dry mode throughout shipping and storage. Reports from the test farms indicated that the products arrived in a dry and free flowing state and were liquefied and sprayed on the test crops without issue. Samples were also tested by Eurofins of DesMoines, Iowa for mineral content. Products were loaded at 72% and have been stored for more than 60 days without signs of moisture accumulation.

Example 11

Filtration

Sulfur filter media—156 ml of water is blended with 96 g of zinc sulfate until dissolved. The resulting liquid media is then blended with 410 g of FLO-GARD 210 precipitated silica for five minutes in a stainless steel blender. The resulting product is also transitioned from a liquid state to a dry mode during the five minute blending period and is placed in sample containers marked zinc sulfate. The zinc sulfate loaded precipitated silica granules is then divided into two equal parts and placed into two stackable 100 mesh sieves to form a two stage filter. A third 100 mesh sieves is added to the top of the stack to retain the zinc sulfate loaded precipitated silica granules filter media. The stacked sieves are then added to a small 8-inch round×5-foot tall smoke stack. 227 g of sulfur power is placed inside the smoke stack and ignited and allowed to burn for 10 minutes. The zinc sulfate loaded precipitated silica granules media is then removed from each sieves and packaged in sample containers "A" and "B" for testing by Austin Analytical of Austin, Tex. Testing will determine the amount of sulfur captured in each stage of filtration.

Those skilled in the art will recognize that many changes and modifications can be made to the method of practicing the invention without departing the scope and spirit of the invention. In the drawings and specification, there have been disclosed embodiments of the invention and, although specific terms are employed, they are used in a generic and descriptive sense only and not for the purpose of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification. Furthermore, language referring to order, such as first and second, should be understood in an exemplary sense and not in a limiting sense. For example, it can be recognized by those skilled in the art that certain steps can be combined into a single step.

Having described the invention above, various modifications of the techniques, procedures, materials, and equipment will be apparent to those skilled in the art. While various embodiments have been shown and described, various modifications and substitutions may be made thereto. Accordingly, it is to be understood that the present invention has been described by way of illustration(s) and not limitation. It is intended that all such variations within the scope and spirit of the invention be included within the scope of the appended claims. The singular forms "a", "an" and "the" may include plural referents, unless the context clearly dictates otherwise. By way of example, the term "a food additive" could include one or more food additives used for the stated purpose. Moreover, the present invention may suitably comprise, consist or consist essentially of the elements disclosed and may be practiced in the absence of an element not disclosed.

What is claimed is:

1. A composition for delivering microorganisms in a dry mode, the composition comprising:

precipitated silica granules having a porous structure comprising pores in each silica granule; and microorganisms loaded throughout the pores of the precipitated silica granules, wherein the composition is operable to allow for propagation of the microorganisms within the pores of the precipitated silica granules.

2. The composition of claim 1, wherein the composition has an initial microorganism count, the composition operable to maintain approximately 50 to 400% of the initial microorganism count for at least 45 days after loading.

3. The composition of claim 1, further comprising an absence of zeolites.

4. The composition of claim 1, further comprising an absence of aluminosilicates.

5. The composition of claim 1, further comprising an absence of a silica-free mineral powder.

6. The composition of claim 1, wherein the composition is operable to breakdown hydrocarbon deposits in water or soil.

7. The composition of claim 1, wherein the composition is operable to breakdown hydrocarbon deposits in water or soil when applied in a dry fashion.

8. The composition of claim 1, further comprising an absence of an acidic polymer.

9. The composition of claim 1, further comprising nutrients loaded in the precipitated silica granules, such that the nutrients are in contact with the microorganisms, wherein the nutrients are operable to provide a food source to the microorganisms loaded throughout the pores of the precipitated silica granules to enhance propagation of the microorganisms.

10. The composition of claim 1, wherein the pores have diameters within the range of 38 to 240 nanometers.

11. The composition of claim 1, wherein the composition has a shelf life of at least two years.

12. The composition of claim 1, further comprising enzymes loaded throughout the pores of the precipitated silica granules.

13. The composition of claim 1, wherein the microorganisms are selected from the group consisting of bacteria, fungi, archaea, viruses, algae, plankton, planaria, protists, and combinations thereof.

14. The composition of claim 13, wherein the microorganism is a *Bacillus*.

15. The composition of claim 1, further comprising nutrients loaded throughout the pores of the precipitated silica granules.

16. The composition of claim 15, wherein the nutrients are selected from the group consisting of ammonia, nitrogen, ammonium nitrogen, urea, dextrose, dextrin, sugars, and combinations thereof.

17. A composition for delivering enzymes in a dry mode, the composition comprising:

precipitated silica granules having a porous structure comprising pores in each silica granule; and enzymes loaded throughout the pores of the precipitated silica granules, wherein the composition is operable to allow for propagation of the enzymes within the pores of the precipitated silica granules.

* * * * *